US008335262B2

(12) United States Patent
Hluchyj et al.

(10) Patent No.: US 8,335,262 B2
(45) Date of Patent: Dec. 18, 2012

(54) DYNAMIC RATE ADJUSTMENT TO SPLICE COMPRESSED VIDEO STREAMS

(75) Inventors: Michael G. Hluchyj, Wellesley, MA (US); Santosh Krishnan, Wellesley, MA (US); Christopher Lawler, Wellesley, MA (US); Qin-Fan Zhu, Acton, MA (US)

(73) Assignee: Verivue, Inc., Westford, MA (US)

( * ) Notice: Subject to any disclaimer, the term of this patent is extended or adjusted under 35 U.S.C. 154(b) by 1192 days.

(21) Appl. No.: 12/015,490

(22) Filed: Jan. 16, 2008

(65) Prior Publication Data

US 2009/0180534 A1      Jul. 16, 2009

(51) Int. Cl.
*H04N 7/12* (2006.01)
*H04J 3/18* (2006.01)

(52) U.S. Cl. .................... 375/240.24; 370/477

(58) Field of Classification Search .......... 370/485–487, 370/535–538, 468, 395.21, 395.43, 395.53, 370/389, 477; 375/240, 240.1, 240.01, 240.24, 375/316, 324, 340, 341; 380/241
See application file for complete search history.

(56) References Cited

U.S. PATENT DOCUMENTS

| | | | |
|---|---|---|---|
| 5,216,503 A | 6/1993 | Paik et al. ..................... 358/133 |
| 5,231,633 A | 7/1993 | Hluchyj et al. ................ 370/94.1 |
| 5,341,474 A | 8/1994 | Gelman et al. ................ 395/200 |
| 5,424,770 A | 6/1995 | Schmelzer et al. | |
| 5,499,046 A | 3/1996 | Schiller et al. | |
| 5,534,944 A | 7/1996 | Egawa et al. ................... 348/584 |
| 5,550,577 A | 8/1996 | Verbiest et al. .................. 348/7 |
| 5,594,490 A | 1/1997 | Dawson et al. | |
| 5,805,804 A | 9/1998 | Laursen et al. | |
| 5,859,660 A | 1/1999 | Perkins et al. .................... 348/9 |
| 5,878,220 A | 3/1999 | Olkin et al. | |
| 6,011,798 A | 1/2000 | McAlpine | |
| 6,055,577 A | 4/2000 | Lee et al. | |
| 6,154,496 A | 11/2000 | Radha ...................... 375/240.28 |
| 6,480,539 B1 | 11/2002 | Ramaswamy ........... 375/240.03 |
| 6,567,471 B1 | 5/2003 | Yoshinari ................ 375/240.26 |
| 6,578,093 B1 | 6/2003 | Armen et al. | |
| 6,606,112 B1 | 8/2003 | Falco | |
| 6,678,332 B1 | 1/2004 | Gardere et al. | |

(Continued)

FOREIGN PATENT DOCUMENTS

CA    2 466 458    12/2004
(Continued)

OTHER PUBLICATIONS

Hurst et al., "MPEG Splicing: Tutorial and Proposed SMPTE Standard," *SMPTE Journal*: pp. 1-14 (Nov. 1998).

(Continued)

*Primary Examiner* — Hanh N Nguyen
(74) *Attorney, Agent, or Firm* — Proskauer Rose LLP

(57) ABSTRACT

Described are computer-based methods and apparatuses, including computer program products, for dynamic rate adjustment to splice video streams. A splicer receives a first compressed video stream of bits and buffers the first video stream of bits in a first buffer. The splicer receives a second compressed video stream of bits to splice into the first compressed video stream. The splicer buffers the second compressed video stream of bits in a second buffer. The splicer determines a departure time for a splice in-point of the second compressed video stream of bits. The splicer adjusts a rate of the first compressed video stream of bits, a rate of the second compressed video stream of bits, or both to achieve the departure time.

34 Claims, 8 Drawing Sheets

U.S. PATENT DOCUMENTS

| | | | | |
|---|---|---|---|---|
| 6,714,545 | B1 | 3/2004 | Hugenberg et al. | 370/395.1 |
| 6,912,251 | B1 | 6/2005 | Ward et al. | |
| 6,937,770 | B1 | 8/2005 | Oguz et al. | 382/235 |
| 6,944,585 | B1 | 9/2005 | Pawson | |
| 6,971,119 | B1 | 11/2005 | Arsenault et al. | 725/89 |
| 7,080,400 | B1 | 7/2006 | Navar | 725/139 |
| 7,107,309 | B1 | 9/2006 | Geddes et al. | 709/203 |
| 7,342,968 | B2 * | 3/2008 | Balakrishnan et al. | 375/240.26 |
| 7,380,028 | B2 * | 5/2008 | Crinon et al. | 710/52 |
| 7,502,368 | B2 * | 3/2009 | Sanders et al. | 370/389 |
| 7,561,515 | B2 | 7/2009 | Ross | |
| 7,593,433 | B1 * | 9/2009 | Wu et al. | 370/537 |
| 7,624,416 | B1 | 11/2009 | Vandermolen et al. | |
| 2002/0019984 | A1 | 2/2002 | Rakib | 725/111 |
| 2003/0051251 | A1 | 3/2003 | Sugimoto et al. | 725/95 |
| 2003/0208765 | A1 | 11/2003 | Urdang et al. | 725/90 |
| 2003/0212708 | A1 | 11/2003 | Potrebic et al. | 707/104.1 |
| 2003/0221197 | A1 | 11/2003 | Fries et al. | 725/117 |
| 2004/0117829 | A1 | 6/2004 | Karaoguz et al. | 725/46 |
| 2004/0218093 | A1 | 11/2004 | Radha et al. | |
| 2004/0218617 | A1 | 11/2004 | Sagfors | |
| 2005/0028213 | A1 | 2/2005 | Adler et al. | 725/89 |
| 2005/0039213 | A1 | 2/2005 | Matarese et al. | 725/95 |
| 2005/0147122 | A1 | 7/2005 | Florimond Van Acker et al. | 370/468 |
| 2005/0188099 | A1 | 8/2005 | Patel | |
| 2005/0223107 | A1 | 10/2005 | Mine et al. | 709/231 |
| 2005/0256873 | A1 | 11/2005 | Walker et al. | 707/9 |
| 2006/0010467 | A1 | 1/2006 | Segel | 725/34 |
| 2006/0067320 | A1 | 3/2006 | Wahl et al. | 370/392 |
| 2006/0085829 | A1 | 4/2006 | Dhodapkar et al. | 725/105 |
| 2006/0117357 | A1 | 6/2006 | Surline | 725/90 |
| 2006/0143668 | A1 | 6/2006 | DuBreuil | 725/89 |
| 2006/0165088 | A1 | 7/2006 | Monta et al. | |
| 2006/0187950 | A1 | 8/2006 | Bou-Diab et al. | 370/432 |
| 2006/0230176 | A1 | 10/2006 | Dacosta | 709/235 |
| 2006/0294555 | A1 | 12/2006 | Xie | 725/88 |
| 2007/0055984 | A1 | 3/2007 | Schiller et al. | 725/32 |
| 2007/0070895 | A1 | 3/2007 | Narvaez | |
| 2007/0130601 | A1 | 6/2007 | Li et al. | 725/112 |
| 2009/0083811 | A1 | 3/2009 | Dolce et al. | |
| 2009/0083813 | A1 | 3/2009 | Dolce et al. | |
| 2009/0182843 | A1 | 7/2009 | Hluchyj et al. | |
| 2009/0217318 | A1 | 8/2009 | VerSteeg et al. | |
| 2009/0285217 | A1 | 11/2009 | Frink et al. | |

FOREIGN PATENT DOCUMENTS

| | | |
|---|---|---|
| EP | 0755157 A2 | 1/1997 |
| EP | 0 772 360 | 5/1997 |
| EP | 1115252 A2 | 7/2001 |
| EP | 1 365 587 | 11/2003 |
| EP | 1 389 874 | 2/2004 |
| EP | 1655963 A2 | 5/2006 |
| EP | 1 675 399 | 6/2006 |
| WO | WO 01/56285 | 8/2001 |
| WO | WO 02/09425 A1 | 1/2002 |
| WO | WO 2007/028245 | 3/2007 |

OTHER PUBLICATIONS

Tudor, P.N., "MPEG-2 Video Compression," *Electronics and Communication Engineering Journal*: pp. 1-14 (Dec. 1995).

ISO/IEC 13818-1: ITU-T Recommendation H.222.0: Series H: Audiovisual and Multimedia Systems: Infrastructure of Audiovisual Services—Transmission Multiplexing and Synchronization; Information Technology-Generic Coding of Moving Pictures and Associated Audio Information Systems: 1-171 (May 27, 1999).

ISO/IEC 13818-2: ITU-T Recommendation H.262: Series H: Audiovisual and Multimedia Systems: Infrastructure of Audiovisual Services—Coding of Moving Video Information Technology—Generic Coding of Moving Pictures and Associated Audio Information: Video: 1-220 (Feb. 17, 2000).

ISO/IEC 14496-10: ITU-T Recommendation H.264: Series H: Audiovisual and Multimedia Systems: Infrastructure of Audiovisual Services—Coding of Moving Video: Advanced Video Coding for Generic Audiovisual Services: 1-343 (Mar. 1, 2005).

SCTE 35 (ITU-T J.181) ANST/SCTE 35 2004: Digital Program Insertion Cueing Message for Cable, pp. 1-37 (2004).

Carretero, J., et al., "A hierarchical disk scheduler for multimedia systems," Future Generations Computer Systems, Elsevier Science Publisher. Amsterdam, NL, vol. 19, No. 1, Jan. 1, 2003, pp. 23-35.

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

"Proxy server," Wikipedia, http://en.wikipedia.org/wiki/Proxy_server, Jan. 15, 2008, 7 pages.

"Web cache," Wikipedia, http://en.wikipedia.org/wiki/Web_cache, Jan. 15, 2008, 2 pages.

"Web cache," Wikipedia, http://en.wikipedia.org/wiki/Proxy_cache, Jan. 15, 2008, 2 pages.

"Reverse proxy," Wikipedia, http://en.wikipedia.org/wiki/Reverse_proxy, Jan. 15, 2008, 2 pages.

Berners-Lee, T., et al., "Hypertext Transfer Protocol—HTTP/1.0," http://tools.ietf.org/html/rfc1945, May 1996, 57 pages.

Björk et al., "Transcoder Architectures for Video Coding," *IEEE Transactions on Consumer Electronics*, 44(1): 88-98 (Feb. 1998).

Cerpa, A., et al., "NECP the Network Element Control Protocol," http://tools.ietf.org/html/draft-cerpa.necp-02, Feb. 22, 2000, 38 pages.

Cooper, I., et at. "Known HTTP Proxy/Caching Problems," http://tools.ietf.org/html/rfc3143, Jun. 2001, 30 pages.

Cooper, I., et al., "Known HTTP Proxy/Caching Problems," draft-cooper-wrec-known-prob-01.txt, http://tools.ietf.org/html/draft-cooper-wrec-known-prob-01, Apr. 12, 2001, 32 pages.

Cooper, I., et al., "Internet Web Replication and Caching Taxonomy," http://tools,ietf.org/html/rfc3040, Jan. 2001, 30 pages.

Fielding, R., et al. "Hypertext Transfer Protocol—HTTP/1.1", http://tools.ietf.org/html/rfc2616, Jun. 1999, 165 pages.

Haskell, Barry G., et al., "Multiplexing of Variable Rate Encoded Streams," IEEE Transactions on Circuits and Systems for Video Technology, 4(4): 417-424 (Aug. 1994).

Kristol, David M., "HTTP Proxy State Management Mechanism," http://tools.ietf.org/html/draft-kristol-http-proxy-state-00, May 26, 1998, 9 pages.

P. Vixie, et al., "Hyper Text Caching Protocol (HTCP/0.0)," http://tools.ietf.org/html/rfc2756, Jan. 2000, 15 pages.

Salehi et al., "Supporting Stored Video: Reducing Rate Variability and End-to-End Resource Requirements Through Optimal Smoothing," *IEEE/ACM Transactions on Networking*, 6(4): 397-410 (Aug. 1998).

Zhang et al., "Smoothing, Statistical Multiplexing, and Call Admission Control for Stored Video," *IEEE Journal on Selected Areas in Communications*, 15(6): 1148-1166 (Aug. 1997).

\* cited by examiner

DYNAMIC RATE ADJUSTMENT TO SPLICE COMPRESSED VIDEO STREAMS

FIELD OF THE INVENTION

The description relates generally to computer-based methods and apparatuses, including computer program products, for dynamic rate adjustment to splice compressed video streams.

BACKGROUND

Digital compressed video based on the Moving Picture Experts Group (MPEG) standards has become the predominant choice for delivering and storing video content. The International Organization for Standardization (ISO)/International Electrotechincal Commission (IEC) 13818 suite specifies the widely deployed MPEG-2 standard, while ISO/IEC 14496 specifies the increasingly popular MPEG-4 standard which provides for a much improved coding efficiency and enhanced error robustness. In general, MPEG distinguishes between the compression layer, responsible for coding the raw video and associated audio signals, and the systems layer, responsible for the carriage, synchronization and timing of multiple such compressed signals. It is also common to find MPEG-4 compressed signals carried on top of the MPEG-2 systems layer.

In a typical MPEG-2 encoder, the compression layer receives a periodic sequence of frames of uncompressed digital video and converts it into a video "elementary stream" of compressed frames. Most commonly, the "frame period" is chosen to be approximately 33 milliseconds to generate a presentation sequence of 30 video frames a second. The elementary stream retains the same fixed frame rate as the input sequence, however the frame sizes (in bits) may vary widely.

Broadly speaking, MPEG-2 compression proceeds in two stages, the first in the pixel domain and the second in the frequency domain. In the first stage, a technique referred to as "motion compensation" is applied to the uncompressed video frames in order to remove temporal redundancy across frames. Specifically, the frames get sub-divided into three types: intra-coded frames (I frames), forward predicted frames (P frames), and bi-directionally predicted frames (B frames). An I frame is self-contained and may be decoded independently by the receiver, whereas P and B frames only contain differential information with respect to other frames. Consequently, the latter are expected to be significantly smaller in size than I frames. In the next stage, blocks of pixels of each frame are converted to the "frequency domain" using the Discrete Cosine Transform (DCT) operation in order to remove the spatial redundancy within the frame. The DCT is an extremely compute intensive step, as it involves matrix multiplication operations. The result of this step is a set of DCT coefficients, one for each block of pixels. To further reduce the amount of bits required to represent each frame, the coefficients are quantized (by dividing each value using a pre-determined scale, with a finer-grain quantization corresponding to a higher video quality) and the quantized set is subject to a "run length" coding and "entropy" coding operations. Relatively speaking, the quantization and run length coding operations are less compute intensive. The final output of the compression layer is a periodic sequence of variable-sized I, P and B frames, efficiently encoded in the frequency domain and represented using the syntax specified by the MPEG-2 standard.

Separate compression layers are responsible for generating one or more (e.g., one per dubbed language) corresponding audio elementary streams. In addition, a video program may also contain one or more data elementary streams, e.g., to carry program-specific information.

The MPEG-2 systems layer multiplexes several compressed elementary streams (e.g. audio, video and data streams), belonging to one or more video programs, into a single "transport stream" (TS), suitable for storage and network transmission of the program or programs. In addition to multiplexing, the systems layer performs several roles including packetization of the compressed signals, clocking, stream synchronization, and timing control.

The MPEG-2 encoder communicates a time-base, referred to as a Program Clock Reference (PCR), to the receiver via a field in the TS packet header. Not all TS packets carry a PCR value; however, we may assume an implicit PCR associated with each packet. A PCR value denotes the relative departure time of the packet at the sender. The systems layer assumes a constant-delay transmission network and relies on independent means to compensate for delay jitter in the network, if any. Consequently, the PCR also denotes the relative arrival time of the packet at the receiver. As MPEG-2 is primarily designed for an open-loop network, the sequence of incoming PCR values is used by the receiver to lock its clock to that of the sender, so as to maintain an identical frame period as at the input to the encoder, and thereby also to avoid underflow and overflow with respect to the incoming stream. In order to control and synchronize (e.g., to maintain lip sync) the presentation time of each audio and video frame in the multiplex, the encoder communicates a Presentation Time-Stamp (PTS) with each frame. In addition, to provide for correct decoding of bi-directionally predicted frames, the systems layer at the encoder sends frames in decoding order (as opposed to presentation order), and communicates a Decode Time-Stamp (DTS) with each frame. A compliant MPEG-2 receiver essentially receives TS packets belonging to a frame at their indicated (or implicit) PCR values and buffers them temporarily. A frame is removed from the buffer and decoded at its specified DTS value, and is presented to the viewer at its PTS value.

While the goal of the compression layer is to minimize the amount of bits required to represent the audio/video frames, one of the goals of the systems layer is to efficiently utilize the capacity of a communications channel. An encoder achieves this goal by smoothing the transmission of the variable-sized I, P and B frames through a buffer, and constraining the peak bit-rate of the transport stream. Larger frames are transmitted over a longer time interval as opposed to the smaller ones, yielding a variable frame rate of departure (and arrival at the receiver). In order to help the receiver re-construct the fixed frame rate of presentation, while maintaining an open-loop network model, the encoder maintains and controls a model of the receiver buffer, called the Video Buffering Verifier (VBV). Typically, the receiver buffer is controlled by assigning a DTS value to a frame such that the sum of the delays experienced by each frame in the sender and receiver buffers is a constant. The size of the receiver buffer is referred to as the VBV buffer size, which is communicated in the sequence header of the elementary stream, while the amount of time each frame spends in the buffer is referred to as its VBV delay, which equals the difference between the arrival time of its first bit and its DTS value. As long as a receiver adheres to the VBV delay of the first frame of a sequence (initial VBV delay), the presentation can proceed at the frame rate of the original video source without danger of underflow or overflow at the receiver until the end of that sequence.

Splicing refers to the back-to-back concatenation of two streams in order to create a single continuous stream. The last frame of the first stream is referred to as the "out-point" frame, while the first frame of the second stream is referred to as the "in-point" frame. In terms of bits of a MPEG TS (and as used in this application), the last bit of the first stream can be referred to as the out-point, and the first bit of the second stream as the in-point. A splice is "seamless" if the resultant stream is both syntactically correct (i.e., adheres to the MPEG stream syntax in the case of compressed MPEG video) and free of noticeable visual glitches. At a minimum, a visually seamless splicing operation must ensure that the VBV buffer does not overflow or underflow, the stream does not violate the capacity of the communications channel, and a fixed frame rate of presentation can be maintained in the resultant stream. Note that if bits are lost either due to a VBV overflow or a violation of channel capacity, it may result in a long lasting glitch if the affected frame or frames are referenced by other prediction-based frames. If the VBV buffer underflows, it results in a "freeze-frame," wherein a single frame is presented for more than one frame period. Moreover, any underflow represents lost time, which may be critical in the case of live video streams.

A common and increasingly important application of splicing is Digital Program Insertion (DPI). FIG. 1 shows a network 100 with DPI, as illustrated in the art. The network 100 includes a network encoder 102, an ad server 104, a DPI system 106, and a decoder 108. The ad server 104 includes one or more storage devices (e.g., storage device 110 and storage device 112). The DPI system 106 includes a splicer 114. The splicer can be, for example, a splicing apparatus belonging to the operator of network 100 (e.g., a regional telco service provider or a cable multiple systems operator). A DPI system 106 receives a network stream 116 for distribution to its customers (e.g., through the decoder 108). The network stream 116 can be a broadcast channel. The network stream 116 includes embedded "cue messages" that indicate opportunities for the operator to insert advertisements or other local programs. In response to the cue messages, the splicer 114 sends an ad request 118 to the ad server 104 instructing it to stream an advertisement at a specified time instant. The ad request 118 contains the necessary information (e.g., channel number, program identifier, opportunity identifier, etc.) for the ad server 104 to determine the exact video stream to serve. The ad server 104 transmits an advertisement (ad) stream 120 to the splicer 114. At the appropriate time, the splicer 114 switches from the network stream 116 to the ad stream 120 provided by the ad server 104, and back to the network stream 116 at the end of the advertisement (e.g., the end of the ad stream 120). The spliced stream 122 is thus a back-to-back concatenation of multiple video sequences. Commercial splicers typically support several concurrent splicing operations, but do not scale very well.

Splicing uncompressed digital video streams or analog video streams (e.g., National Television Standards Committee (NTSC), or Phase Alternating Line (PAL)) is fairly straightforward. A splicer can switch between the out-point frame of the first stream and the in-point frame of the second stream during the vertical blanking interval between consecutive frames. One of the most difficult problems associated with splicing compressed video streams is related to the variable frame rate of arrival at the receiver and the corresponding VBV buffer management.

FIG. 2 shows an arrival sequence 200 for splicing as illustrated in the art. The arrival sequence 200 includes an arrival time of stream one 210, an arrival time of stream two 220, and a decode time of the spliced stream 230. Stream one 212 includes frame N-2 212A, frame N-1 212B, and frame N 212C. Stream two 214 includes frame 1 214A, frame 2 214B, and frame 3 214C. The decode time of spliced stream 230 includes a decode time of stream 1 frame N-2 216A, a decode time of stream 1 frame N-1 216B, a decode time of stream 1 frame N 216C, a decode time of stream 2 frame 1 216D, a decode time of stream 2 frame 2 216E. The arrival sequence 200 includes a frame N VBV delay 218, a frame 1 VBV delay 220, a frame period 222, and an arrival overlap time 224. The arrival overlap time 224 is the difference between the arrival time of the first bit 228 of frame 1 214A and the arrival time of the last bit 226 of frame N 212C. The frame N VBV delay 218 is the time difference between the arrival time of the first bit 230 of frame N 212C and the decode time of stream 1 frame N 216C. The frame 1 VBV delay 220 is the difference between the decode time of stream 2 frame 1 216D and the arrival time of the first bit 228 of frame 1 214A. Stream one and stream two are transmitted at or below peak rate R 232. Time 234 progresses from the left to the right of the splicing process 200.

Each frame (e.g., frame N-2 212A, frame N-1 212B, and frame 1 214A) must adhere to its VBV delay (e.g., the VBV delay of frame N 212C is frame N VBV delay 218), controlled by the encoder, in order to maintain a fixed frame rate of presentation. The VBV delays of consecutive frames in a sequence are related by the initial VBV delay, the frame period, the sizes of the frames and the transmission bit rate. However, in general, the VBV delay of the out-point frame is completely unrelated to the VBV delay of the in-point frame. For example, frame N 212C is the out-point frame and frame 1 214A is the in-point frame, where the frame N VBV delay 218 is completely unrelated to the frame 1 VBV delay 220. To achieve seamless splicing, the in-point frame 1 214A must nevertheless be removed from the decoder buffer (not shown) exactly one frame period (e.g., frame period 222) after the removal of the out-point frame N 212C. In order to eliminate future underflow or overflow possibilities, the receiver must also adhere to the VBV delay of the in-point (e.g., frame 1 VBV delay 220). To provide for the latter, the splicer (e.g., the splicer 114 from FIG. 1) must ensure that the in-point frame 1 214A arrives at the receiver (e.g., the decoder 108) at precisely the decode time of stream 2 frame 1 216D minus frame 1 VBV delay 220. Specifically, the difference in arrival times of the first bits of the out-point and in-point frames must exactly equal the difference in their VBV delays plus the frame period. This may cause an arrival overlap time 224 of some of the trailing bits of the first stream and the initial bits of the second stream, resulting in a violation of the bit-rate of the channel and an overflow of the receiver buffer.

There are several approaches in the art to deal with the above problem. A common solution is to delay the arrival of the first bit of the second stream (e.g., the first bit of frame 1 214A of stream two 214), if necessary, so as to eliminate the arrival overlap (e.g. the arrival overlap time 224). However, this may cause an underflow in the VBV buffer and a freeze-frame artifact, thereby rendering the splice non-seamless. A second approach is to uncompress both streams at the splicer, concatenate in the pixel domain, and compress the resultant stream, essentially re-creating the VBV buffer model for the spliced stream. This solution is extremely compute intensive, as it involves full decode and encode operations, and does not scale very well. A third approach, commonly found in high-end commercial splicers, is to perform partial decode and encode operations in the frequency domain via a technique known as "transrating." Specifically, the DCT coefficients around the splice point are retrieved and re-quantized in order to reduce the amount of bits and eliminate any potential overlap in arrival times. While less compute intensive with respect to the second approach, transrating remains a bottleneck in scaling a compressed video splicer. Moreover, transrating compromises video quality around the splice point. A final approach, which is the basis of the Society of Motion Picture and Television Engineers (SMPTE) 312M standard, is to pre-condition the splice points so as to prevent any possibility of arrival overlap. This approach found limited favor in the industry due to the difficulty in pre-conditioning streams so as to allow for the worst-case overlap scenario.

SUMMARY OF THE INVENTION

The techniques described herein provide methods and apparatuses for seamless splicing of compressed video streams in a highly scalable and cost-effective fashion. A described splicer apparatus does not rely on compute-intensive techniques such as re-coding and transrating for VBV buffer management. Instead, the splicer uses a "burst buffer" and a "rate adjustment" technique, which systematically delivers a portion of the spliced stream using a slightly oversped burst. This eventually ensures that there is no overlap in the transmission times of the streams being spliced together.

In one aspect, there is a method. The method includes receiving a first compressed video stream of bits and buffering the first video stream of bits in a first buffer. The method further includes receiving a second compressed video stream of bits and buffering the second compressed video stream of bits in a second buffer. The method further includes determining a departure time for a splice in-point of the second compressed video stream of bits. The method further includes adjusting a rate of the first compressed video stream of bits, a rate of the second compressed video stream of bits, or both to achieve the departure time.

In another aspect, there is a computer program product. The computer program product is tangibly embodied in an information carrier. The computer program product includes instructions being operable to cause a data processing apparatus to receive a first compressed video stream of bits and buffering the first video stream of bits in a first buffer. The computer program product further includes instructions being operable to receive a second compressed video stream of bits and buffering the second compressed video stream of bits in a second buffer. The computer program product further includes instructions being operable to determine a departure time for a splice in-point of the second compressed video stream of bits. The computer program product further includes instructions being operable to adjust a rate of the first compressed video stream of bits, a rate of the second compressed video stream of bits, or both to achieve the departure time.

In another aspect, there is a system. The system includes a first buffer and a second buffer. The system includes a splicer in communication with the first buffer and the second buffer. The splicer is configured to receive a first compressed video stream of bits. The splicer is configured to transmit the first compressed video stream of bits to the first buffer. The splicer is configured to receive a second compressed video stream of bits. The splicer is configured to transmit the second compressed video stream of bits to the second buffer. The system includes a multiplexer in communication with the first buffer and the second buffer. The multiplexer is configured to determine a departure time for a splice in-point of the second video stream of bits. The system includes a controller in communication with the first buffer and the second buffer. The system is configured to adjust a rate of the first compressed video stream of bits, a rate of the second compressed video stream of bits, or both, to achieve the departure time.

In another aspect, there is a system. The system includes a means for receiving a first compressed video stream of bits and buffering the first video stream of bits in a first buffer. The system includes a means for receiving a second compressed video stream of bits and buffering the second compressed video stream of bits in a second buffer. The system includes a means for determining a departure time for a splice in-point of the second compressed video stream of bits. The system includes a means for adjusting a rate of the first compressed video stream of bits, a rate of the second compressed video stream of bits, or both to achieve the departure time In some examples, any of the aspects above can include one or more of the following features. A rate of the first compressed video stream of bits, a rate of the second compressed video stream of bits, or both are adjusted to achieve the departure time. A burst rate is calculated. A portion of the first compressed video stream, a portion of the second compressed video stream, or both, are transmitted at the burst rate. A second burst rate is calculated. The portion of the first compressed video stream or the portion of the second compressed video stream are transmitted at the second burst rate.

In other examples, the burst rate is calculated based on a factor greater than one. The factor is based on available channel capacity, an actual overlap time, a time based on the splice in-point of the second compressed video stream of bits and a second splice in-point, or any combination thereof.

In some examples, the departure time for the splice in-point of the second compressed video stream of bits is determined without reference to the burst rate. A second departure time for a second splice in-point of the first compressed video stream of bits is determined. The rate of the first compressed video stream of bits, the rate of the second compressed video stream of bits, or both, is adjusted to achieve the second departure time.

In other examples, a second departure time is determined for a second splice in-point of a third compressed video stream of bits. The rate of the first compressed video stream of bits, the rate of the second compressed video stream of bits, a rate of the third compressed video stream of bits, or any combination thereof, is adjusted to achieve the second departure time.

In some examples, a seamless splice is achieved. A first portion of the first compressed video stream, a second portion of the second compressed video stream from the second buffer, or both, is transmitted without altering the compression of the first video stream, the second video stream, or both. A first portion of the first compressed video stream, a second portion of the second compressed video stream, or both, is transmitted without decrypting the first video stream, the second video stream, or both.

In other examples, a frame associated with the first compressed video stream of bits, a frame associated with the second compressed video stream of bits, or both, is transmitted at an earlier time than a corresponding scheduled departure time. A first portion of the first compressed video stream is transmitted at no more than a maximum overlap time earlier than a scheduled departure time. The maximum overlap time is based on a maximum Video Buffering Verifier (VBV) delay of the second compressed video stream of bits minus a frame period.

In some examples, the first portion of the first compressed video stream of bits is transmitted after the first buffer is substantially full, a second portion of the second compressed video stream of bits after the second buffer is substantially fall, or both. A required buffer size is calculated. A required buffer size is calculated by calculating a maximum overlap time.

In other examples, a maximum overlap time is calculated based on the difference between a maximum VBV delay of the second compressed video stream of bits and a frame period. A first portion of the first compressed video stream of bits, a second portion of the second compressed video stream of bits, or both, is buffered in a receiving buffer.

In some examples, a size of the receiving buffer is greater than a standard buffer size used to support transmitting the first portion of the first compressed video stream of bits at a non-bursting rate. The size of the receiving buffer is at least two times greater than a standard buffer size used to support transmitting the first portion of the first compressed video stream of bits at a non-bursting rate.

In other examples, a burst start time is calculated. A burst end time is calculated. The burst start time is calculated based on a burst duration. The burst end time is calculated based on the sum of the burst start time and the burst duration. The burst end time is the splice in point of the second compressed video stream of bits. The burst start time is the burst end time minus a duration based on an actual overlap time.

In some examples, the controller is configured to calculate a burst rate. The controller is configured to transmit a portion of the first compressed video stream, a portion of the second compressed video stream, or both at the burst rate.

In other examples, the controller is configured to calculate a second burst rate. The controller is configured to transmit the portion of the first compressed video stream or the portion of the second compressed video stream at the second burst rate.

In some examples, the controller is configured to calculate a burst rate based on a factor greater than one. The factor is based on available channel capacity, an actual overlap time, a time based on the splice in-point of the second compressed video stream of bits and a second splice in-point, or any combination thereof.

In other examples, a burst capable network is in communication with the multiplexer. The controller is configured to transmit a frame associated with the first compressed video stream of bits at an earlier time than a scheduled time of the frame. The controller is configured to transmit a first portion of the first compressed video stream at no more than a maximum overlap time earlier than the schedule time. The maximum overlap time is based on a maximum Video Buffering Verifier (VBV) delay of the second video stream of bits minus a frame period.

In some examples, the controller is configured to calculate a burst start time and a burst end time. A receiving buffer is in communication with the multiplexer. The receiving buffer is configured to buffer a first portion of the first compressed video stream of bits, a second portion of the second compressed video stream of bits, or both.

In other examples, the receiving buffer size is greater than a standard buffer size used to support transmitting a first portion of the first compressed video stream at a non-bursting rate. The controller is configured to calculate a required size of the first buffer, the second buffer, or both.

The techniques described herein may enable one or more of the following advantages. An advantage of the rate adjustment technique is its ease of implementation which enables scalability. In addition, it is highly flexible in terms of the required burst rate, and the duration and timing of the burst. Another advantage is the quality of the video around the splice point is not compromised, and the solution is agnostic of the specific compression layer. Additionally, the solution may be applied to seamlessly splice streams whose compression layer bits are encrypted, without requiring decryption of those bits or any knowledge of the specific encryption scheme. The techniques described herein are particularly well suited for deployment in telco networks and "video over DOCSIS" in cable MSO networks, where the communications channel for video provides a variable bandwidth capacity, allowing for the burst from the splicer.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, a splicer receives a first compressed video stream of bits and buffers the first video stream of bits in a first buffer. The splicer receives a second compressed video stream of bits to splice into the first compressed video stream. The splicer buffers the second compressed video stream of bits in a second buffer. The splicer determines a departure time for a splice in-point of the second compressed video stream of bits. The splicer adjusts a rate of the first compressed video stream of bits, a rate of the second compressed video stream of bits, or both to achieve the departure time. Adjusting the rate of the first compressed video stream of bits, the rate of the second compressed video stream of bits, or both that ensures the last bit of the out-point frame from the first stream departs before the first bit of the in-point frame from the second stream.

Figure 1:
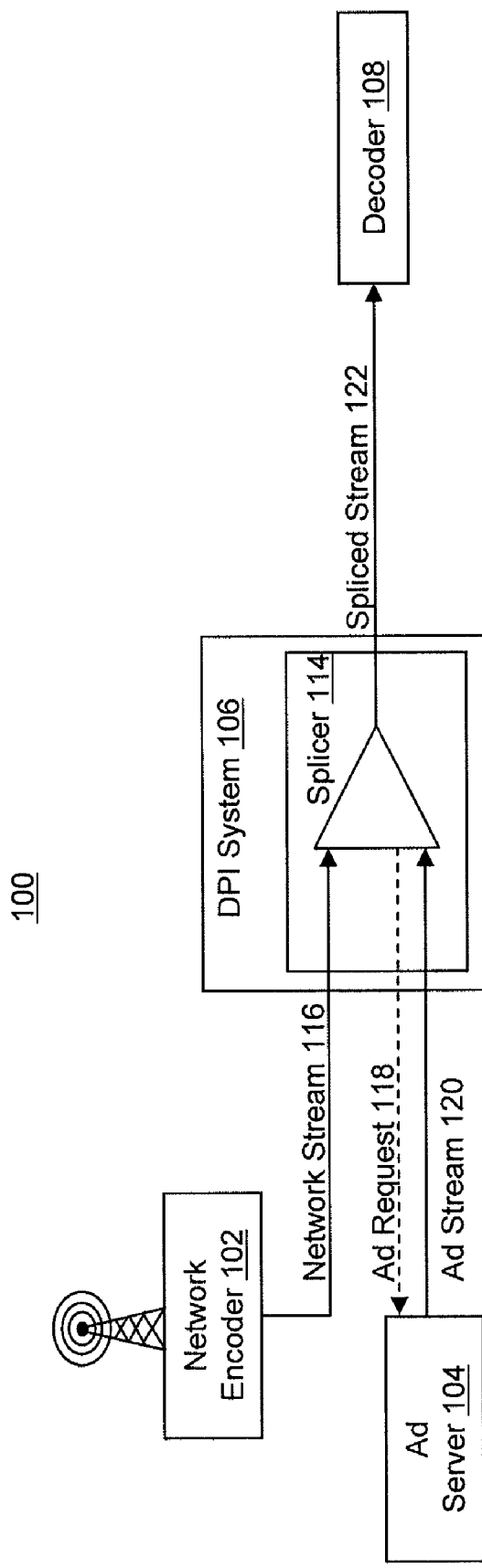
FIG. 1 shows a network with DPI as known in the art.
Figure 2:
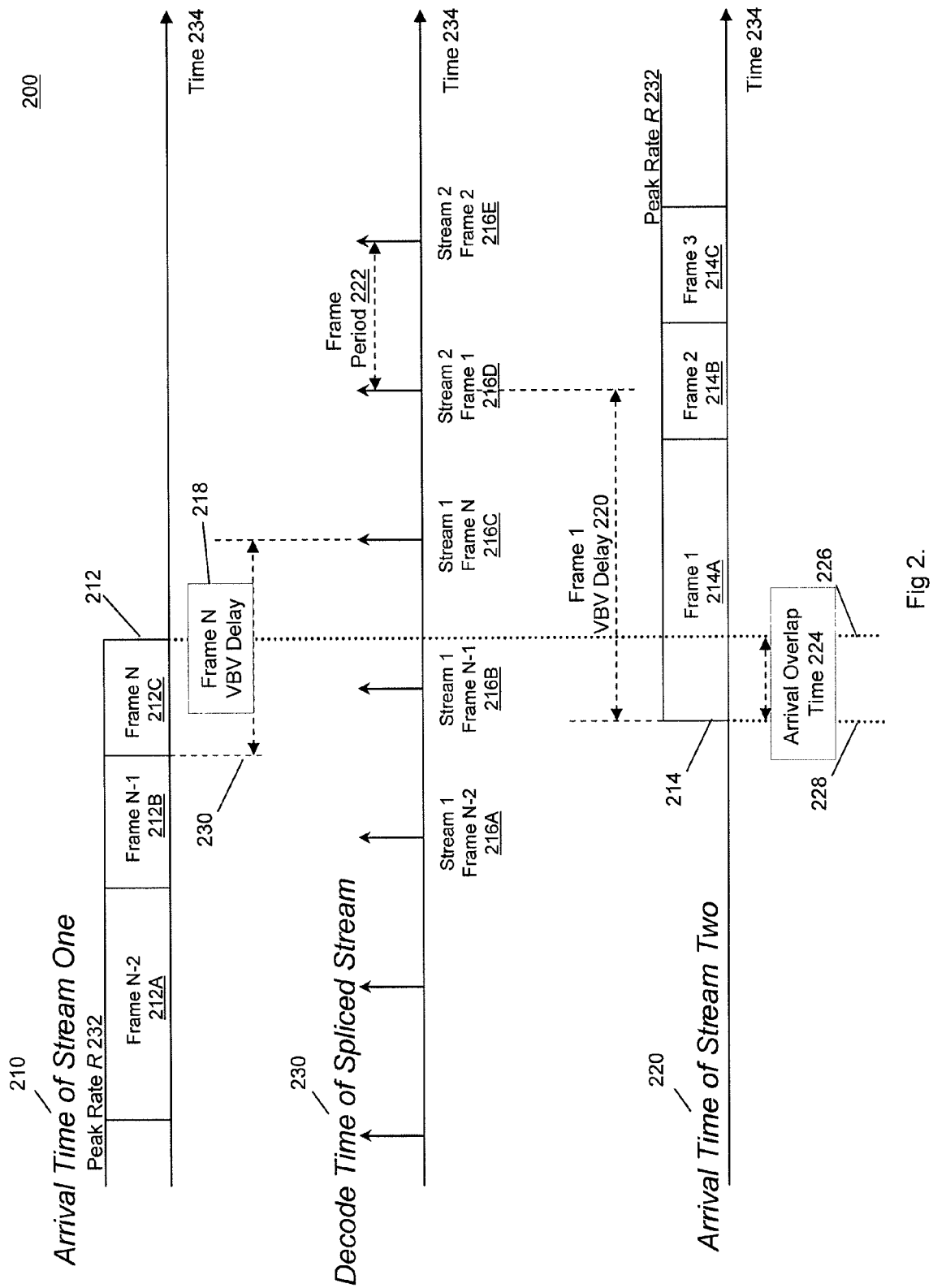
FIG. 2 shows an arrival sequence for splicing as known in the art.
Figure 3:
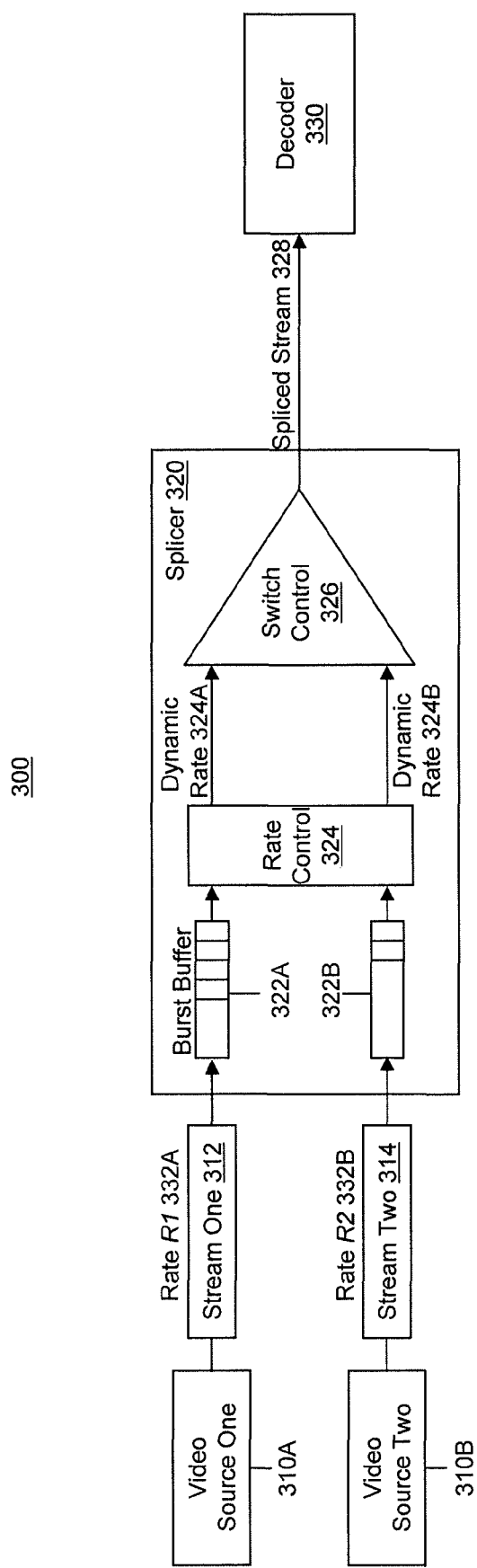
FIG. 3 shows a splicing system for seamlessly splicing multiple video streams.

FIG. 3 shows the splicing system 300 for seamlessly splicing multiple video streams. The splicing system 300 includes a video source one 310A, a video source two 310B, a splicer 320, and a decoder 330. The video source one 310A can be, for example, a network encoder. The video source two 310B can be, for example, an ad server. The splicer 320 includes a burst buffer 322A, a burst buffer 322B, a rate control 324, and a switch control 326. The splicer 320 receives stream one 312 at a first rate R1 332A. The splicer 320 receives stream two 314 at a second rate R2 332B. The first rate R1 332A and the second rate R2 332B can be the same rate. For example, the splicer 320 receives two compressed video streams, stream one 312 and stream two 314, to be concatenated at a specified time instant. The streams may correspond to live network feeds or streams originated on-demand from storage attached to a video server. Each stream is associated with a temporary memory store burst buffer. For example, the splicer 320 receives bits from stream one 312, and the splicer 320 queues stream one 312 in the burst buffer 322A. The splicer 320 receives bits from stream two 314 and the splicer 320 queues stream two 314 in the burst buffer 322B. The bits from video source one 310A and video source two 310B can correspond to MPEG frames.

The rate control component 324 modulates the departure from the burst buffer (e.g., burst buffer 322A and burst buffer 322B). For example, the rate control component 324 can change the departure time of bits of stream one 312 with respect to its arrival time in order to prevent overlap with the transmission of stream two 314. The rate control 324 controls the beginning and end of each burst duration, and the departure rate (e.g., dynamic rate 324A and dynamic rate 324B) to be used while bursting. The departure rate (e.g., the dynamic rate 324A or dynamic rate 324B) can be set equal to the arrival rate (e.g., rate R1 332A or rate R2 332B) while not bursting. The splicer 320 may have an initial startup delay during which no bits depart from the burst buffer (e.g., burst buffer 322A or burst buffer 322B) as the buffer is filled. Video source two 310B can be requested in advance of the specified splicing instant, which causes burst buffer 322B to be filled with bits from stream two 314.

The switch control component 326 determines the exact departure time of the in-point frame and switches the transmission to video source two 310B at the exact departure time, resulting in a spliced stream 328. If, for example, further splices are anticipated for the spliced stream 328, video source two 310B becomes the subject of rate adjustment and the departure time of video source two 310B is also modulated by the rate control component 324. Advantageously, by appropriately modulating the departure times, any overlap in out-point and in-point frames is prevented, resulting in a seamless splice. Although FIG. 3 only shows two video sources, those skilled in the art can appreciate the splicer 320 can be extended to support multiple video sources and consequently multiple concurrent splices.

The last bit of the out-point frame, for example, arrives at the receiver no later than the decode time of the out-point frame. The maximum potential value of overlap time (e.g., arrival overlap time 224), for example, between the out-point frame (e.g., frame N 212C) and the in-point frame (e.g., frame 1 214A) is no more than the in-point frame VBV delay (e.g., frame 1 VBV delay 220) minus the associated frame period (e.g., frame period 222). The rate control component 324 in the splicer 320 can ensure that the out-point (e.g., as indicated by the line 226) finishes transmission (and arrives at the decoder 330) X seconds prior to the time scheduled by its source encoder, where X can denote the maximum value of overlap time (e.g., arrival overlap time 224). The splicer 320 can achieve this by bursting nX seconds worth of bits of stream one 312 at (1+1/n) times the encoded rate R1 332A of the stream. The value of n can be based on available channel capacity, the actual overlap time, the difference in time between the splice in-point of the second compressed video stream of bits and a second splice in-point, or any other relevant factor related to the transmission of the compressed video streams. The burst period nX (see FIG. 5) and the rate multiplier (1+1/n) are configured by the choice of n. For example, the longer the duration of the burst, the lower the required burst rate. The maximum duration can be constrained by other factors such as the desired amount of time between consecutive splices. For example, if an advertisement is 30 seconds long, and the maximum VBV delay is 1 second, the splicer 320 can use a burst rate less than or equal to 1.033 times the original rate of the stream.

Since the bits of stream one 312 may arrive at the decoder 330 X seconds prior to its MPEG scheduled arrival time based on Rate R1 332A (indicated or implicit PCR), the receiver can utilize an additional buffer size of X seconds at the peak rate of stream one 312. In some embodiments, a compliant MPEG receiver provides a buffer size large enough to compensate for the maximum VBV delay at the peak rate, and since X itself does not exceed the maximum VBV delay, the total buffering required at the receiver to benefit from this technique can be less than or equal to twice that of a compliant MPEG receiver. Advantageously, due to the early arrival of the out-point, the potential for overlap in the arrival times of the out-point and in-point frames is eliminated, thereby leading to a seamless splice.

Figure 4:
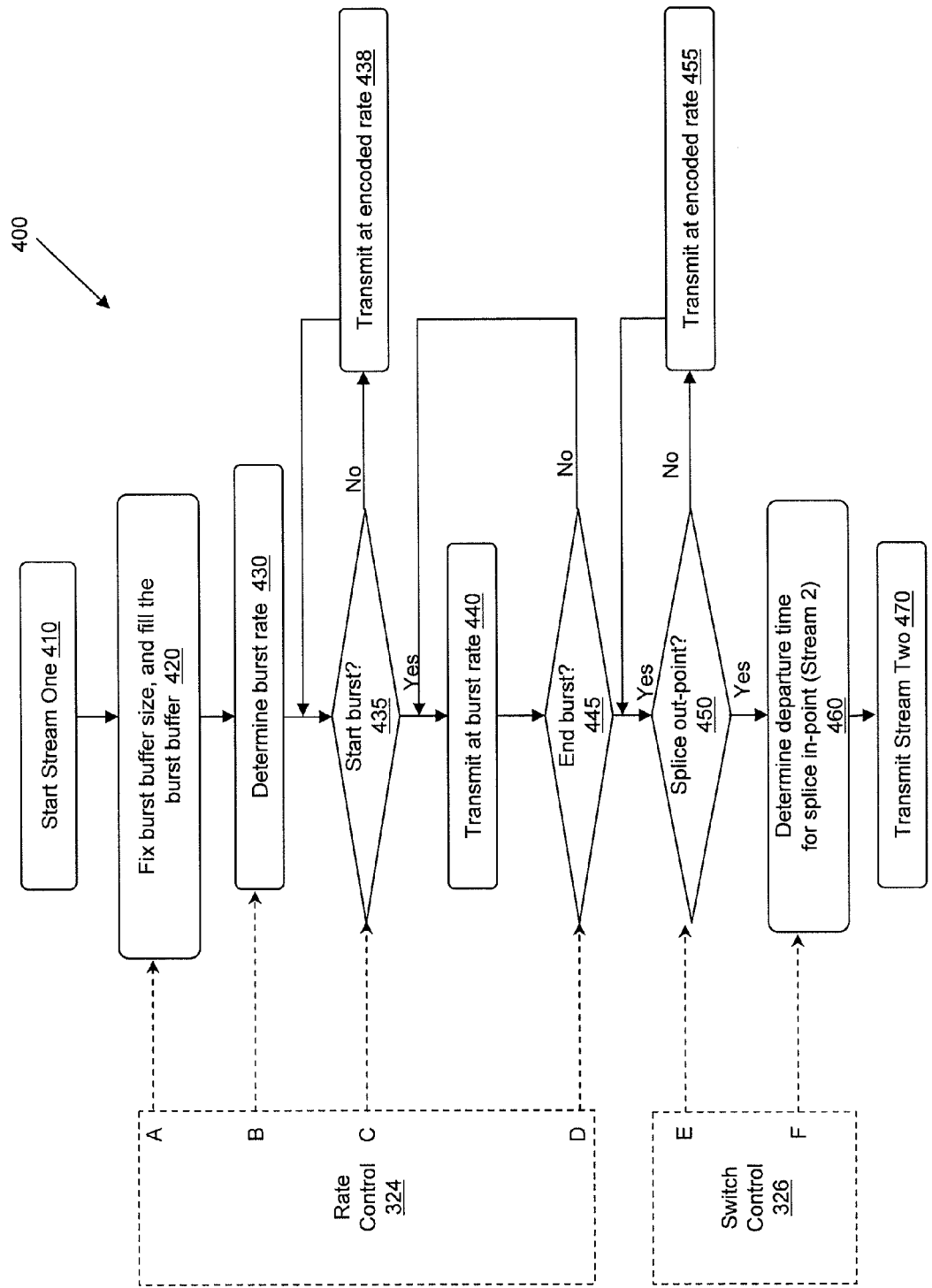
FIG. 4 is a flowchart showing dynamic rate adjustment.

FIG. 4 is a flowchart showing an exemplary dynamic rate adjustment process 400 using components from FIG. 3. At the initiation of stream one, the splicer 320 chooses (410) a burst buffer size (e.g., the size of the burst buffer 322A) and waits for the buffer to completely fill before the first bit is allowed (420) to depart. The receiver (e.g., the decoder 330) may or may not incur an additional startup delay prior to the presentation of the first frame. In the case of a live stream, for example, a viewer can be presented frames that are delayed with respect to the live feed by less than the maximum VBV delay. A maximum VBV delay can be, for example, on the order of a few hundred milliseconds for MPEG-2 encoded video. In the case of stored streams, for example, the storage can be co-located with the splicer (e.g., the splicer 320). The burst buffer can be considered part of the storage and immediately deemed to be full and ready.

Bits are transmitted from the buffer (e.g., burst buffer 322A) at the encoded rate of the stream (e.g., the dynamic rate 324A). This can be done, for example, when the burst buffer 322A is full. The rate control component 324 (430) determines the burst rate. In some examples, the rate control component 324 determines a burst start time and a burst end time. The burst start time and burst end time can be determined before the burst rate. The rate control component 324 determines (435) if the time is a burst start time. If the time is a burst start time, the splicer 320 transmits (440) at the burst rate. For example, bits can be transmitted from the burst buffer (e.g., the burst buffer 322A) at the burst rate (e.g., the dynamic rate 324A). If the time is not a burst start time, bits are transmitted (438) at the encoded rate (e.g., the rate R1 332A). The burst buffer can be emptied at a rate faster than it is filled, potentially leading to the emptying of the buffer. In some examples, the buffer size and burst duration are chosen in such a fashion that the burst buffer never underflows.

Throughout the transmission, the PCR of the burst stream is re-stamped to accurately reflect the adjusted rate, while the DTS and PTS values remain unchanged, thereby leaving the presentation time of each frame unaffected by the rate adjustment. The rate control component 324 determines (445) if the time is a burst end time. If the time is not a burst end time, the rate control component 324 continues transmitting (440) at the burst rate. If the time is (445) a burst end time or any time following the burst end time, the switch control 326 determines (450) if the time is a splice out-point. If the time is not a splice-out point, the splicer 320 transmits (455) the stream (e.g., stream one 312) at its original encoded rate (e.g., rate R1 332A). If the time is (450) a splice out-point of the splice, the switch control 326 determines (460) the departure time of the first bit of the in-point frame (e.g., of stream two 314). For example, the departure time of the first bit of the splice in-point can be calculated from the original (i.e., not re-stamped)

PCR value of the first bit of the out-point frame, the frame period and the VBV delay values of the in-point and out-point frames. For simplicity, it can be assumed that the system time of splicer 320 is determined relative to the original (i.e., not re-stamped) PCR values of stream one. The departure time of the first bit of the splice in-point is then calculated as the original (i.e., not re-stamped) PCR value of the first bit of the out-point frame plus the VBV delay value for the out-point frame plus the frame period minus the VBV delay value of the in-point frame. The VBV delay for a frame is equal to the difference between its PCR and DTS values. The splicer 320 switches (470) transmission to stream two 314 at the determined departure time. Thus, the splicer 320 creates a spliced stream. The system layer headers can be unencrypted so the sender can, for example, seamlessly splice streams without decrypting compression layer bits of the frames. The sender (e.g. the splicer 320) need not have any knowledge of the specific encryption scheme.

The in-point departure time of step (460) can be calculated without consideration to the rate adjustment (e.g., through the rate control component 324) in the splicer 320 in order to prevent the overlap of out-point and in-point frames. The splicer can ensure stream two 314 arrives in advance of the splicing point. The splicer 320 can thus fill the corresponding burst buffer for the in-point stream (e.g., burst buffer 322B for stream two 314) prior to the departure time of the in-point. The splicer 320 can use the dynamic rate adjustment process 400 to splice stream one back in after stream two has been spliced in. The splicer 320 can use the dynamic rate adjustment process 400 to splice in a third stream or any other number of streams back to back.

Figure 5:
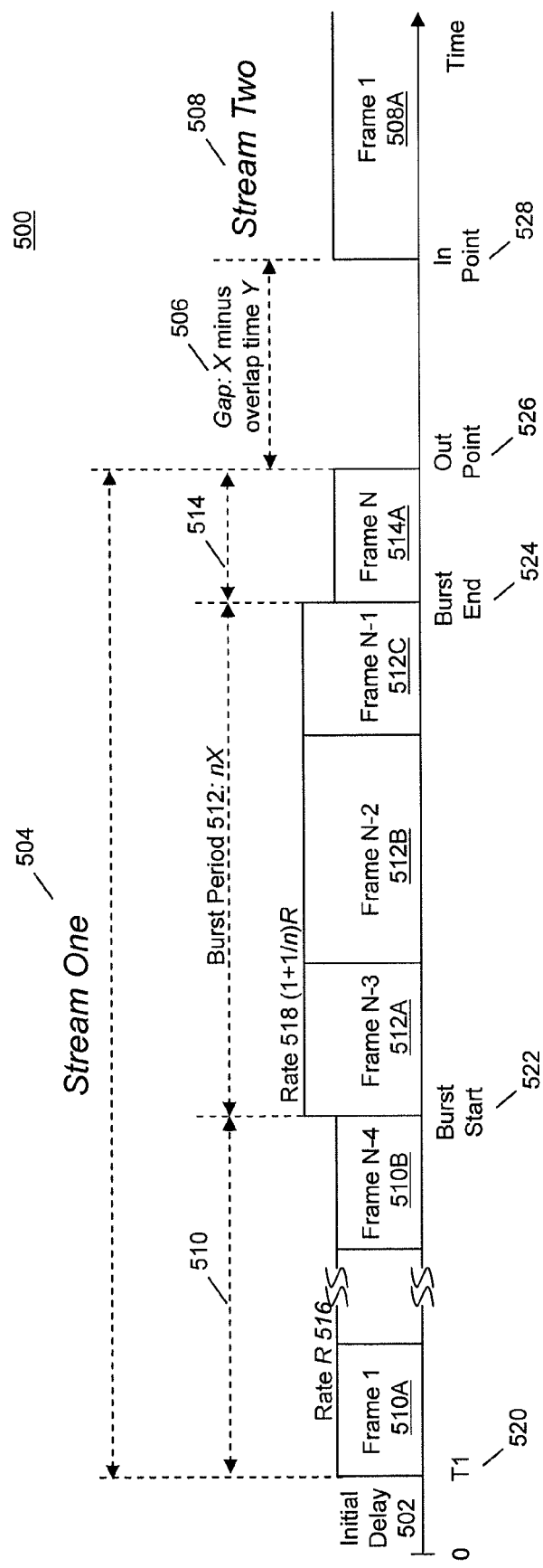
FIG. 5 shows an arrival sequence of an exemplary embodiment.

FIG. 5 shows the arrival sequence 500 of a preferred embodiment. The arrival sequence 500 includes an initial delay 502, stream one 504, gap 506, and stream two 508. Stream one 504 includes a first non-burst period 510, a burst period 512, and a second non-burst period 514. In some embodiments, there is no second non-burst period 514. In some embodiments, there is no first non-burst period 510. The first non-burst period 510 includes frame 1 510A through frame N-4 510B. The first non-burst period 510 is transmitted (e.g., by the splicer 320 of FIG. 3) at encoded rate R 516. The burst period 512 includes frame N-3 512A, frame N-2 512B, and frame N-1 512C. In some embodiments, the burst period can include any number of frames. The burst period 512 is transmitted at rate (1+1/n)R 518. The second non-burst period 514 includes frame N 514A. In some embodiments, the second non-burst period can include any number of frames. The gap 506 is X minus the overlap time Y. Stream 2 508 includes frame 1 508A. Stream 2 508 can include any number of frames. For simplicity, FIG. 5 shows rate adjustments occurring only at frame boundaries. This is not a restrictive aspect of the system, as rate adjustments can occur between frame boundaries as well.

The first bit of frame 1 510A arrives at time T1 520. In some examples, time T1 520 and the initial delay 502 can be X. The last bit of frame N-4 510B arrives just before burst start time 522. The first bit of frame N-3 512A arrives at burst start time 522. The last bit of frame N-1 512C arrives at burst end time 524. The last bit of frame N 514A arrives at the out point 526. The first bit of frame 1 508A arrives at the in point 528. The actual overlap time can be less than the compensated maximum overlap time. The gap 506 between the out-point 526 and in-point 528 can be wasted channel capacity. For some embodiments, the minimum interval between consecutive splices must be greater than nX seconds (e.g., the burst period 512).

Figure 6:
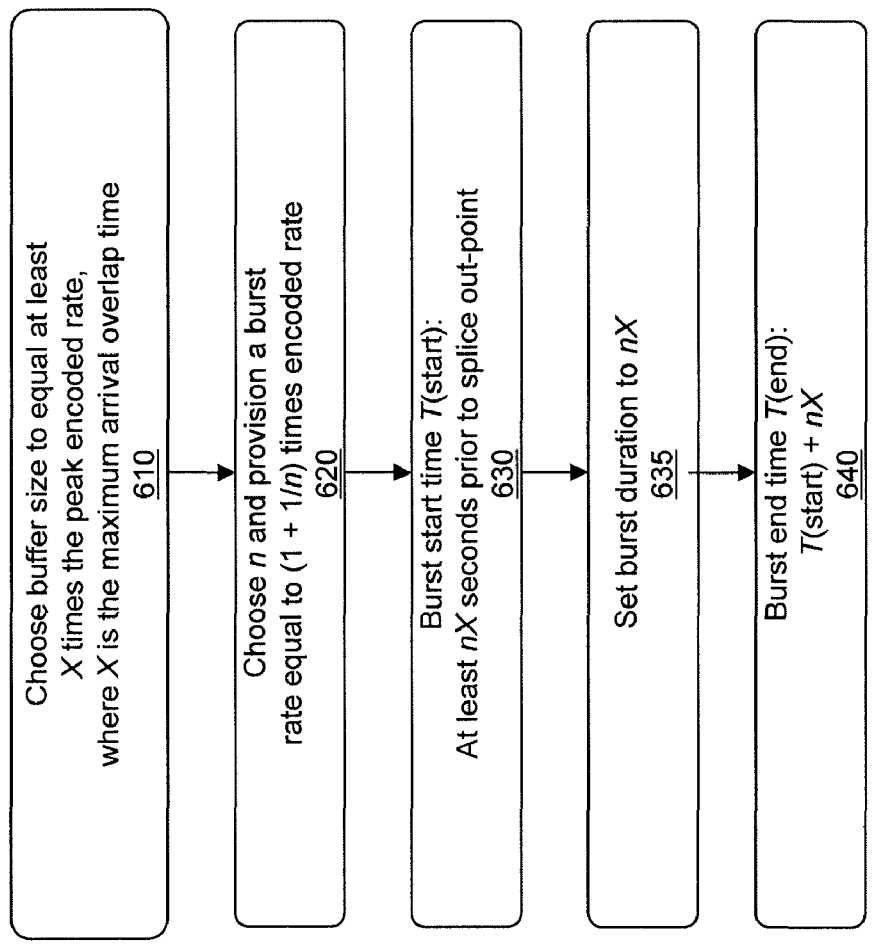
FIG. 6 shows a configuration process of an exemplary embodiment.

FIG. 6 shows a configuration process 600 of a preferred embodiment with reference to the components of FIG. 3 and FIG. 5. The rate control component 324 can configure the burst buffer size, the burst rate, the beginning of the burst duration, or the end of each burst duration, or any combination. The rate control component 324 can configure the splicer 320 to burst substantially in advance of the out-point frame N 514A. The rate control component 324 can compensate for the maximum potential overlap time. The rate control component 324 can configure the splicer 320 to burst as early as at stream initialization. The burst buffer size (e.g., burst buffer 322A) is chosen (610) to equal at least the maximum overlap time X at the peak rate of the encoded video stream one 504. A value of n is chosen (620) and the burst rate is fixed at (1+1/n) times the encoded rate R 516 to result in the rate (1+1/n)R 518. The value of n can, for example, depend on the available channel capacity. The burst start 522 time is configured (630) to be at least nX seconds prior to the out-point 526. The burst period 512 is set (635) to nX seconds. The burst end time 524 is set (640) to the burst start time 522 plus nX. At the end of the burst (e.g., frame N-3 512A through frame n-1 512C), the burst buffer can become empty. All the subsequent bits (e.g., from the last bit of frame N-1 512C to the last bit of the frame N 514A) can arrive at the receiver (e.g., decoder 330) X seconds prior to the arrival time scheduled by the encoder. This embodiment, for example, minimizes the burst buffer size and the initial delay.

Figure 7:
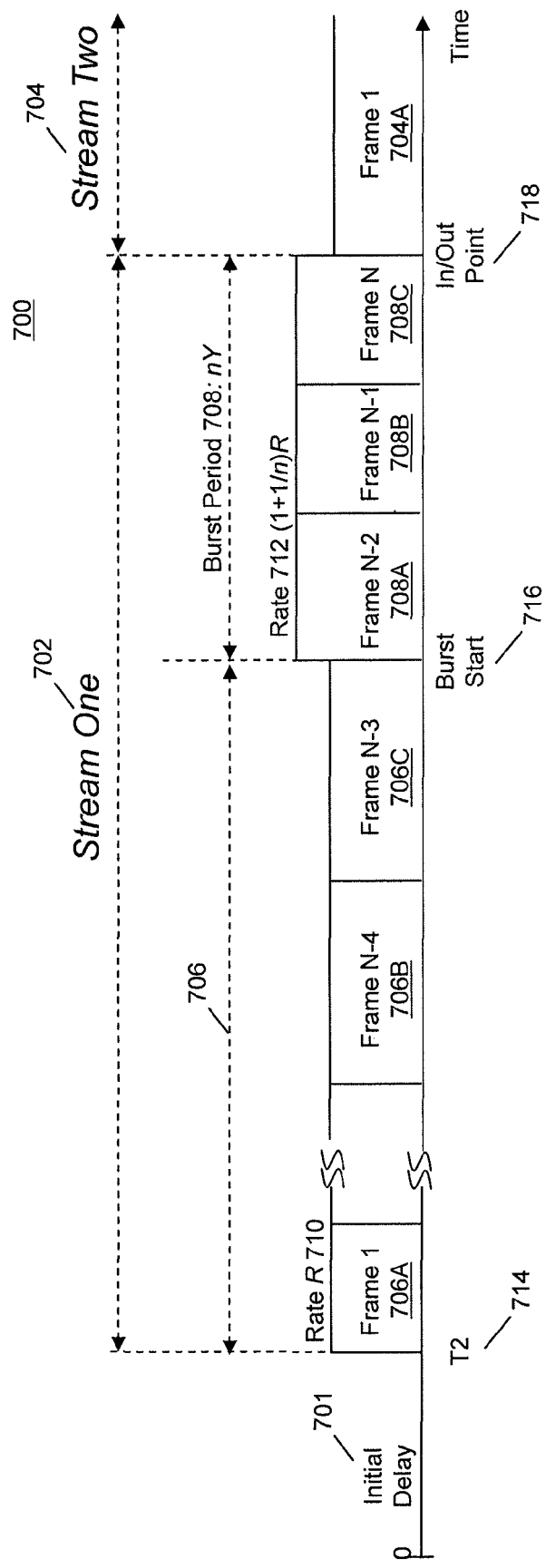
FIG. 7 shows an arrival sequence of an alternate embodiment.

FIG. 7 shows the arrival sequence 700 of an alternate embodiment. The arrival sequence 700 includes an initial delay 701, stream one 702, and stream two 704. Stream one 702 includes a non-burst period 706 and a burst period 708. The burst period 708 is nY, where Y is the actual value of overlap time 224. Non-burst period 706 includes frame 1 706A, frame N-4 706B, and frame N-3 706C. The non-burst period 706 is transmitted at rate R 710. The burst period 708 includes frame N-2 708A, frame N-1 708B, and frame N 708C. The burst period 708 is transmitted at rate 712 (1+1/n) R, where R is rate R 710. Stream one 702 can have any number of additional frames. Stream two 704 includes frame 1 704A. Stream two 704 can include any additional number of frames. Frame 1 706A of stream one 702 arrives at time T2 714. In some examples, the time T2 714 and initial delay 701 can be nX The burst period 708 begins at burst start time 716. The burst period 708 ends exactly at the desired out-point 718 of the splice. Calculating Y can, for example, eliminate waste of the channel capacity. Calculating Y can use, for example, a look-ahead capability. A look-ahead capability can be supported with a larger burst buffer with respect to the preferred embodiment. Calculating Y can result in a higher delay associated with filling the burst buffer than the example described above where there is gap.

Figure 8:
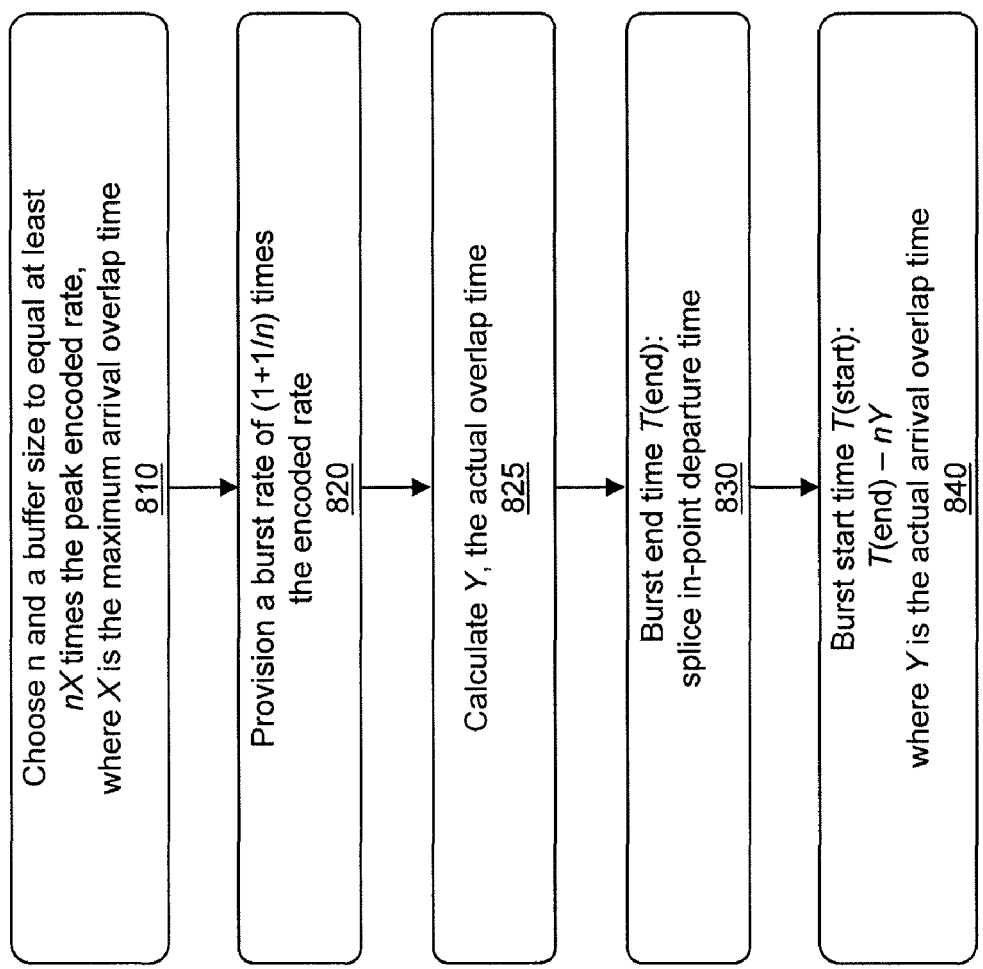
FIG. 8 shows a configuration process of an alternative embodiment.

FIG. 8 shows a configuration process 800 of an alternative embodiment. The splicer 320 of FIG. 3, for example, compensates only for the actual overlap time Y. The actual overlap time Y can vary between 0 and X seconds. The configuration process 800 can increase the utilization of the channel with respect to, for example, the preferred embodiment. The configuration process 800 can use a larger burst buffer in order to facilitate the computation of the actual overlap time. The burst buffer size (e.g., the burst buffer 322A) is chosen (810) to equal at least nX seconds at the peak rate 710. X can denote the maximum value of arrival overlap time (e.g., the arrival overlap time 224). A value of n is chosen. The value of n can be based on the available channel capacity, the actual overlap time Y, the difference in time of the current splice-in point and a subsequent splice-in point, or any other factor relevant to calculating the burst rate. The burst rate (e.g., dynamic rate 324A) is set (820) to (1+1/n) times the encoded rate. For example, the burst rate 712 of FIG. 7 can be set to (1+1/n)R, where R is rate R 710. The actual overlap time Y is calculated (825). The burst buffer can be used as a look-ahead buffer in order to compute the actual overlap time Y. Y is less than or equal to X. The value of Y equals the VBV delay of the out-point frame plus the frame period minus the VBV delay of the in-point frame, or zero, whichever is higher. The burst end time is set (830) to the splice in-point departure time. For example, the end of the burst period 708 is set to the in/out point 718. The burst start time is configured (840) to be nY seconds prior to the desired out-point. For example, the burst start time is set to the burst start time 716. The burst duration is fixed at nY seconds (e.g., the burst period 708).

The switch control 326 component can ensure that the first bit of the in-point frame (e.g., the first bit of frame 1 704A) arrives at the receiver at precisely the DTS of the in-point frame minus its VBV delay. The departure time of the first bit of the second stream can be computed without regard to the rate adjustment of the first stream. The compensation achieved by the rate adjustment (e.g., as adjusted by the rate control 324 and the switch control 326), can guarantee that the departure time of the second stream is after the departure time of the last bit of the out-point frame. For example, the burst rate 518 (1+1/n)R guarantees that the departure time of the last bit of frame N 514A is before the departure time of the first bit of the in point frame 1 508A of stream two 508.

While some embodiments of the rate adjustment configuration have been explained, those skilled in the art will recognize other configurations that achieve one or more of the same goals (e.g., preventing an overlap between the out-point and in-point of a splice). The overlap is prevented by systematically modulating the transmission rate. In some embodiments, the rate modulation can create a variable bit rate (VBR) stream at the output of a splicer. In some embodiments, the splicer can choose to dispatch at a constant bit rate (CBR). The CBR can be equal to the configured burst rate, using null stuffing. In some embodiments, the rate adjustment method techniques described herein can be combined with other splicing solutions (e.g., transrating, delaying the arrival of the first bit of the second stream, concatenating and recompressing the splicing streams, pre-conditioning the splice points to prevent overlap, or other existing splicing solutions). Combining the rate adjustment techniques with other solutions can, for example, reduce the burst buffer size and burst rate, while trading off video quality degradation due to transrating. The burst buffer size and burst rate may then be selected to compensate for more typical values of arrival overlap time (e.g., as opposed to the worst case values). The transrating function can be invoked when the selected overlap value is exceeded.

It is advantageous to use a higher-capacity communications channel to accommodate the burst rate. In some embodiments, the receiver buffer need be no more than twice as large as a buffer in a minimally compliant MPEG receiver. In some embodiments, existing MPEG receivers can be used because they can tolerate occasional bursts.

While the techniques described herein are described in the context of MPEG-2 systems constructs, those skilled in the art will recognize that the techniques can apply to other digital video systems. The techniques can be deployed in systems where the communications channel for video provides a variable bandwidth capacity and other networks which can allow a burst from the splicer. The techniques can also be deployed in MSO networks characterized by fixed-bandwidth video communication channels. For example, the source video streams can be preconditioned to a lower bandwidth to ensure the oversped bursts fit within the channel capacity. Those skilled in the art will recognize the techniques can be extended to allow its deployment in many other types of networks and systems.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method comprising:
   receiving a first compressed video stream of bits and buffering the first video stream of bits in a first buffer;
   receiving a second compressed video stream of bits and buffering the second compressed video stream of bits in a second buffer;
   determining a departure time for a splice in-point of the second compressed video stream of bits;
   adjusting a rate of the first compressed video stream of bits, a rate of the second compressed video stream of bits, or both to achieve the departure time; and
   transmitting a frame associated with the first compressed video stream of bits, a frame associated with the second compressed video stream of bits, or both, at an earlier time than a corresponding scheduled departure time.

2. The method of claim 1, wherein adjusting comprises:
   calculating a burst rate; and
   transmitting a portion of the first compressed video stream, a portion of the second compressed video stream, or both, at the burst rate.

3. The method of claim 2, further comprising:
   calculating a second burst rate; and
   transmitting the portion of the first compressed video stream or the portion of the second compressed video stream at the second burst rate.

4. The method of claim 2, wherein calculating the burst rate comprises calculating the burst rate based on a factor greater than one, wherein the factor is based on available channel capacity, an actual overlap time, a time based on the splice in-point of the second compressed video stream of bits and a second splice in-point, or any combination thereof.

5. The method of claim 2, wherein determining comprises determining the departure time for the splice in-point of the second compressed video stream of bits without reference to the burst rate.

6. The method of claim 1, further comprising:
   determining a second departure time for a second splice in-point of the first compressed video stream of bits; and
   adjusting the rate of the first compressed video stream of bits, the rate of the second compressed video stream of bits, or both, to achieve the second departure time.

7. The method of claim 1, further comprising:
   determining a second departure time for a second splice in-point of a third compressed video stream of bits; and
   adjusting the rate of the first compressed video stream of bits, the rate of the second compressed video stream of bits, a rate of the third compressed video stream of bits, or any combination thereof, to achieve the second departure time.

8. The method of claim 1, wherein determining comprises achieving a seamless splice.

9. The method of claim 1, further comprising transmitting a first portion of the first compressed video stream, a second portion of the second compressed video stream from the second buffer, or both, without altering the compression of the first video stream, the second video stream, or both.

10. The method of claim 1, further comprising transmitting a first portion of the first compressed video stream, a second portion of the second compressed video stream, or both, without decrypting the first video stream, the second video stream, or both.

11. The method of claim 1, further comprising transmitting a first portion of the first compressed video stream at no more than a maximum overlap time earlier than a scheduled departure time, wherein the maximum overlap time is based on a maximum Video Buffering Verifier (VBV) delay of the second compressed video stream of bits minus a frame period.

12. The method of claim 1, further comprising transmitting a first portion of the first compressed video stream of bits after the first buffer is substantially full, a second portion of the second compressed video stream of bits after the second buffer is substantially full, or both.

13. The method of claim 1, further comprising calculating a required buffer size.

14. The method of claim 13, wherein calculating the required buffer size comprises calculating a maximum overlap time.

15. The method of claim 14, wherein calculating the maximum overlap time comprises calculating the difference between a maximum VBV delay of the second compressed video stream of bits and a frame period.

16. The method of claim 1, further comprising buffering a first portion of the first compressed video stream of bits, a second portion of the second compressed video stream of bits, or both, in a receiving buffer.

17. The method of claim 16, wherein a size of the receiving buffer is greater than a standard buffer size for a compliant MPEG receiver used to support transmitting the first portion of the first compressed video stream of bits at a non-bursting rate.

18. The method of claim 16, wherein the size of the receiving buffer is at least two times greater than a standard buffer size for a compliant MPEG receiver used to support transmitting the first portion of the first compressed video stream of bits at a non-bursting rate.

19. The method of claim 1, further comprising calculating a burst start time and a burst end time.

20. The method of claim 19, wherein:
    calculating the burst start time comprises calculating a burst duration; and
    calculating the burst end time comprises calculating the sum of the burst start time and the burst duration.

21. The method of claim 19, wherein the burst end time is the splice in point of the second compressed video stream of bits and the burst start time is the burst end time minus a duration based on an actual overlap time.

22. A system comprising:
    a first buffer;
    a second buffer;
    a splicer in communication with the first buffer and the second buffer configured to receive a first compressed video stream of bits, transmit the first compressed video stream of bits to the first buffer, receive a second compressed video stream of bits, and transmit the second compressed video stream of bits to the second buffer;
    a multiplexer in communication with the first buffer and the second buffer configured to determine a departure time for a splice in-point of the second video stream of bits; and
    a rate control component in communication with the first buffer and the second buffer and configured to:
    adjust a rate of the first compressed video stream of bits, a rate of the second compressed video stream of bits, or both, to achieve the departure time; and
    transmit a frame associated with the first compressed video stream of bits, a frame associated with the second compressed video stream of bits, or both, at an earlier time than a corresponding scheduled departure time.

23. The system of claim 22, wherein the rate control component is further configured to:
    calculate a burst rate; and
    transmit a portion of the first compressed video stream, a portion of the second compressed video stream, or both at the burst rate.

24. The system of claim 23, wherein the rate control component is further configured to:
    calculate a second burst rate; and
    transmit the portion of the first compressed video stream or the portion of the second compressed video stream at the second burst rate.

25. The system of claim 23, wherein the rate control component is further configured to calculate a burst rate based on a factor greater than one, wherein the factor is based on available channel capacity, an actual overlap time, a time based on the splice in-point of the second compressed video stream of bits and a second splice in-point, or any combination thereof.

26. The system of claim 22, further comprising a burst capable network in communication with the multiplexer.

27. The system of claim 26, wherein the rate control component is further configured to transmit a first portion of the first compressed video stream at no more than a maximum overlap time earlier than the schedule time, wherein the maximum overlap time is based on a maximum Video Buffering Verifier (VBV) delay of the second video stream of bits minus a frame period.

28. The system of claim 22, wherein the rate control component is further configured to transmit a frame associated with the first compressed video stream of bits at an earlier time than a scheduled time of the frame.

29. The system of claim 22, wherein the rate control component is further configured to calculate a burst start time and a burst end time.

30. The system of claim 29, wherein the receiving buffer size is greater than a standard buffer size for a compliant MPEG receiver used to support transmitting a first portion of the first compressed video stream at a non-bursting rate.

31. The system of claim 22, further comprising a receiving buffer in communication with the multiplexer configured to buffer a first portion of the first compressed video stream of bits, a second portion of the second compressed video stream of bits, or both.

32. The system of claim 22, wherein the rate control component is further configured to calculate a required size of the first buffer, the second buffer, or both.

33. A computer program product, tangibly embodied in a non-transitory computer readable medium, the computer program product including instructions being operable to cause a data processing apparatus to:
    receive a first compressed video stream of bits and buffering the first video stream of bits in a first buffer;
    receive a second compressed video stream of bits and buffering the second compressed video stream of bits in a second buffer;
    determine a departure time for a splice in-point of the second compressed video stream of bits;
    adjust a rate of the first compressed video stream of bits, a rate of the second compressed video stream of bits, or both to achieve the departure time; and
    transmit a frame associated with the first compressed video stream of bits, a frame associated with the second compressed video stream of bits, or both, at an earlier time than a corresponding scheduled departure time.

34. An apparatus comprising:
means for receiving a first compressed video stream of bits and buffering the first video stream of bits in a first buffer;
means for receiving a second compressed video stream of bits and buffering the second compressed video stream of bits in a second buffer;
means for determining a departure time for a splice in-point of the second compressed video stream of bits; and
means for:
adjusting a rate of the first compressed video stream of bits, a rate of the second compressed video stream of bits, or both to achieve the departure time; and
transmitting a frame associated with the first compressed video stream of bits, a frame associated with the second compressed video stream of bits, or both, at an earlier time than a corresponding scheduled departure time.

* * * * *